No. 761,274. PATENTED MAY 31, 1904.
W. R. WALKER.
NUT AND BOLT LOCK.
APPLICATION FILED APR. 8, 1903.
NO MODEL.

Witnesses:
F. E. Arthur
H. E. Chase

Inventor:
Willard R. Walker
By Howard P. Denison
Attorney.

No. 761,274. Patented May 31, 1904.

UNITED STATES PATENT OFFICE.

WILLARD R. WALKER, OF SYRACUSE, NEW YORK.

NUT AND BOLT LOCK.

SPECIFICATION forming part of Letters Patent No. 761,274, dated May 31, 1904.

Application filed April 8, 1903. Serial No. 151,593. (No model.)

*To all whom it may concern:*

Be it known that I, WILLARD R. WALKER, of Syracuse, in the county of Onondaga, in the State of New York, have invented new and useful Improvements in Nut and Bolt Locks, of which the following, taken in connection with the accompanying drawings, is a full, clear, and exact description.

This invention relates to improvements in nut and bolt locks in which the nut is not only prevented from turning, but is also prevented from backing up in case the threads are stripped.

One of the objects sought is to produce a nut-lock which is at once simple, compact, and neat in appearance and which may be manufactured and applied at a minimum cost; but the primary object is to make the locking member substantially U shape and rotatingly mount it in a bearing in the bolt, so that it may be rocked to bring its arms into and out of suitable recesses in the outer end face of the nut without removing the locking member from the bolt.

Figure 1:
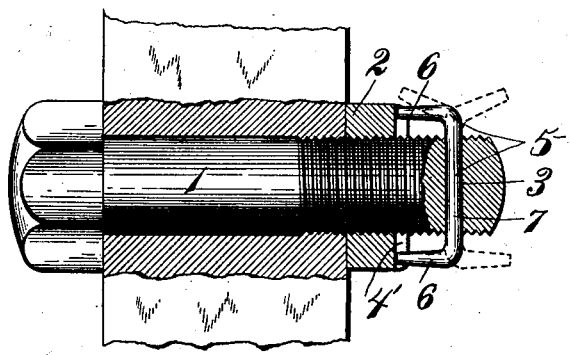
Figure 2:
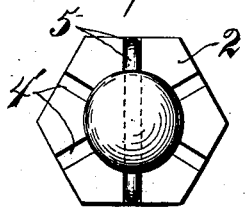
Figure 3:
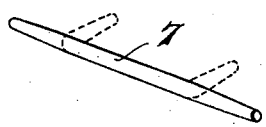

In the drawings, Figure 1 is a sectional view, partly in elevation, of a bolt and nut and the rotatable locking-key therefor. Fig. 2 is an end view of the parts seen in Fig. 1, and Fig. 3 is a perspective view of the key shown in full lines as extended and in dotted lines as bent to the opposite form.

Similar reference characters indicate corresponding parts in all the views.

This nut-lock is especially designed for use on exposed automobile connections, where neatness in appearance is quite as requisite as the function. Aside from this I have sought to construct and arrange a nut-lock which could be easily bent from its operative position and rocked out of the way temporarily to permit a limited adjustment of the bolt or nut for the purpose of taking up the wear, after which the arms of the locking member may be rebent into their locking position.

In Fig. 1 I have shown a threaded bolt 1, upon which is mounted a nut 2, the bolt being formed with a transverse cylindrical opening or bearing 3, and the nut is provided with a series of radial recesses 4 in its outer end face. Journaled in the bearing 3 is a U-shape locking member 5, having its arms 6 operatively seated in the recesses 4 at diametrically opposite sides of the bolt 1, the member 5 being rotatively held in its bearing at the outer end of the nut, and while the arms 6 in the recesses of the nut prevent turning of one part upon the other the intermediate portion, as 7, prevents the backing up of the bolt or nut, at least to the extent of displacement should the threads of one or the other become stripped.

In assembling the parts the nut is adjusted on the bolt to the desired position and the key 5 is inserted in the opening or bearing 3 in its extended position, as seen in Fig. 3, after which its opposite ends are bent over in the same direction into the opposite recesses 4 in the nut. This locking-key is made of soft wire, which is easily bendable, and is rockable in its bearing in the bolt, so that the arms may be bent outwardly and rocked to the position shown by dotted lines, Fig. 1.

Now in case it is desired to further adjust the nut or bolt to take up any wear the arms of the key are simply bent radially out of the recesses and turned outwardly out of the way and then again returned after the adjustment is made.

The distinguishing feature of this key-lock (seen in Figs. 1 and 2) is that when it is desired to further adjust the bolt or nut it is only necessary to bend one of the arms out of its recess and to then rotate the nut, which operation rocks the key in its bearing and throws the other arm out of its recess, as seen by dotted lines, Fig. 1, after which the nut or bolt may be adjusted as desired, and then the key is returned to its operative position with its arms bent into the radial recesses 4. It will thus be seen that the ends of the arms of the locking-key rest in recesses in the nut at opposite sides of the bolt and that owing to this fact the key is prevented from accidental turning in its bearing.

Having thus described my invention, what

I claim, and desire to secure by Letters Patent, is—

In a nut and bolt lock, the combination of a bolt having a transverse cylindrical opening therethrough, a nut having radial recesses in its outer end face, a key having its central portion circular in cross-section and journaled in said opening and its opposite ends bent in the same direction and entering the recesses at opposite sides of the bolt, the key being rotatable in the opening to turn the arms toward and from the adjacent face of the nut.

In witness whereof I have hereunto set my hand this 19th day of March, 1903.

WILLARD R. WALKER.

Witnesses:
H. E. CHASE,
MILDRED M. NOTT.